(No Model.)

J. P. HALL & H. JACOBSEN.
SEED PLANTER.

No. 248,928. Patented Nov. 1, 1881.

UNITED STATES PATENT OFFICE.

JAMES P. HALL AND HENRY JACOBSEN, OF NIANTIC, ILLINOIS.

SEED-PLANTER.

SPECIFICATION forming part of Letters Patent No. 248,928, dated November 1, 1881.

Application filed November 19, 1880. (No model.)

*To all whom it may concern:*

Be it known that we, JAMES P. HALL and HENRY JACOBSEN, citizens of the United States, residing at Niantic, in the county of Macon and State of Illinois, have invented certain new and useful Improvements in Seed-Planters, of which the following is a specification.

The invention is an improvement in the class of check-row planters in which the planting mechanism is operated by the motion of the rower attachment over the ground, which will enable the driver to check-row perfectly, while he is relieved from the considerable labor of operating the planting device by his own strength.

The accompanying drawings form a part of this specification, and represent what we consider the best means of carrying out the invention.

Figure 1:
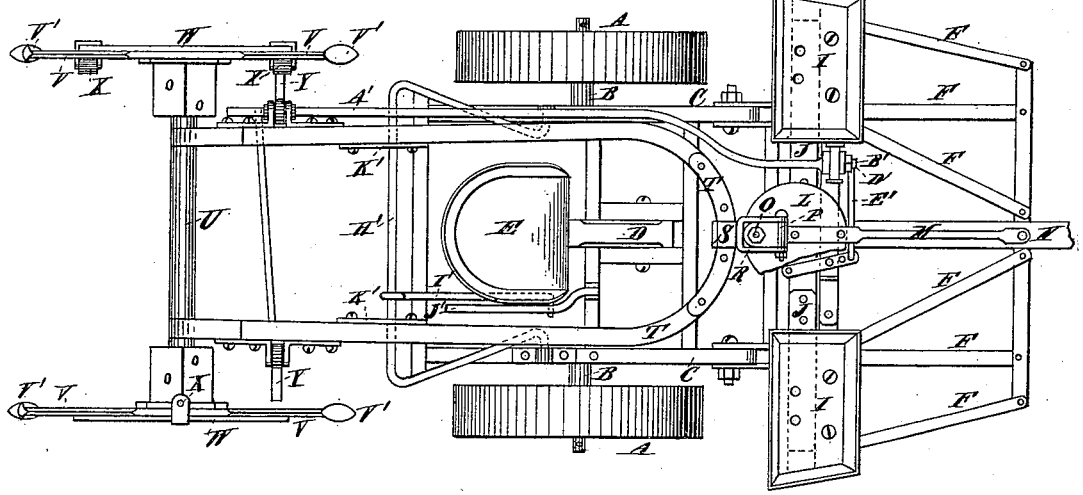
Figure 2:
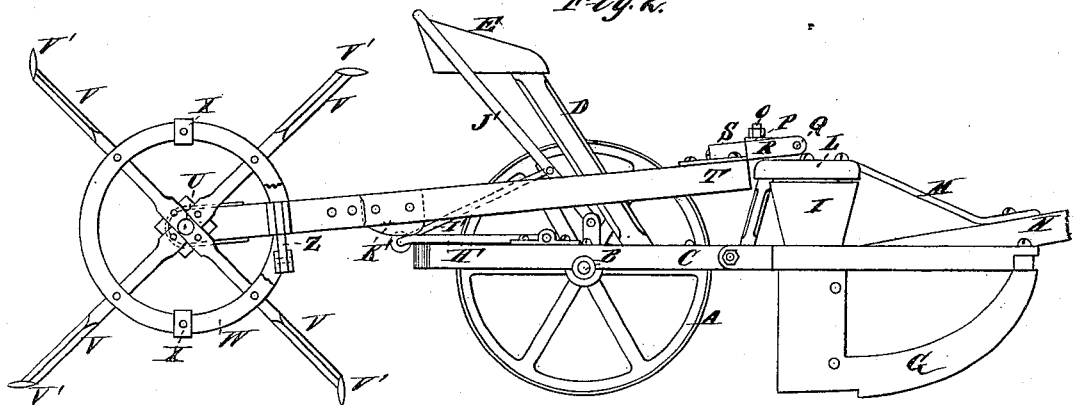
Figure 3:
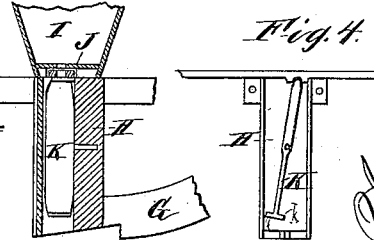
Figure 4:
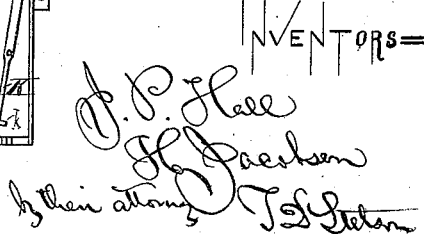

Figure 1 is a top view. Fig. 2 is a side view. Fig. 3 is a vertical longitudinal section of one of the planter-tubes. Fig. 4 is a corresponding transverse section of a portion.

Similar letters of reference indicate like parts in all the figures.

A represents the wheels of the carriage, which revolve upon the journals of the axle B. To the axle B is rigidly attached the frame C, to which, a little in front of the axle B, is attached the lower end of the seat-standard D. The seat-standard D inclines to the rearward, and to its upper end is attached the driver's seat E.

To the forward ends of the side bars of the carriage-frame C is hinged the rear end of the planter-frame F, to which are attached the runners G, that open the ground to receive the seed, the hollow standards or tubes H, that conduct the seed to the ground in the cavities of the forked rear ends of the runners G, and the seed-boxes I. The seed is removed from the seed-boxes I by the slide J, which is operated in the manner hereinafter described. As the seed drops into the cavity of the standards H it is stopped at the lower end of the said standards by the flanged lower ends of the bars K, which are pivoted to the said standards and have their upper ends connected with the dropping-slide J, so that they may be vibrated by the movements of the said slide. They are provided at the base with the flanges $k$, and completely fill the standards H crosswise, so that a separate chamber is formed on either side of the bars when they are moved either way. By this arrangement the seeds will be dropped to the ground promptly and all together.

To the center of the rear part of the planter-frame F is firmly attached a support, L, which is strengthened against the draft-strain by the brace M. The forward end of the brace M is attached to the tongue N or to the forward part of the planter-frame F.

To the support L is firmly attached an upwardly-projecting bolt, O, which passes through a vertical hole in the coupling-block P. Through the forward end of the block P is formed a horizontal hole to receive the bolt Q, which pivots the forked forward end of the short bar R to the said block P. The rear end of the forked coupling-bar R passes through and works in a lug or bearing, S, attached to the center of the forward end or bend of the extended U-shaped frame T of the marker. The coupling O P Q R S allows the rear end of the marker-frame T to move laterally and vertically and to rock, which three movements allow the marker to accommodate itself to the surface of the ground, however rough and uneven the said surface may be, without affecting the operation of the seed-dropping device.

The object of the universal joint is not alone to adapt itself to the unevenness of the ground, but that it may not be affected by the crookedness of the driving of the planter. If this joint had not this lateral motion and the driving were not perfectly straight, it would be thrown out of check.

In bearings attached to the rear ends of the side bars of the frame T revolves an axle, U, to each end of which, or to castings attached to the said ends, are attached the centers of two bars, V. The bars V cross each other at right angles and form skeleton or spoke wheels, and upon their ends are formed sharp-pointed feet V', which are inclined forward, so that they may enter the ground squarely. The front and rear edges of the bars V, just above the feet V', are made sharp, so that they may pass through the soil freely and without slipping, and may thus prevent any irregularity in dropping the seed. Unless our markers have these forward-inclined feet secured to bars or arms with their front and rear edges sharp, the feet will not engage the ground promptly on first touching it, and the motion will vary so that the machine cannot check-row accurately.

To the middle parts of the arms of the bars V are attached rings W, to strengthen the said arms and to form a support for the rollers X. which are pivoted to lugs attached to the said rings W. Two rollers, X, are attached to each ring W at equal distances apart, and the rollers of the two rings W alternate with each other, so that the seed-dropping device may be operated four times for each revolution of the axle U. As the marker-wheels revolve, the rollers X of the two wheels strike the outer arms of the angle-levers Y alternately and move them to operate the seed-dropping device. The angle-levers Y are pivoted at their angles to lugs attached to the outer sides of the side bars of the marker-frame T, and their lower arms are connected by a rod, Z, so that each may be moved by the movement of the other. One of the pivots of the levers Y is replaced by the rear end of the rod A', which works in bearings or a bushing in the lugs that support the said lever Y, and the part which passes through the said lever and bushing is made square, so that the said rod A' may be rocked by the movements of the said angle-levers Y. The forward end of the rod A' passes through and works in a bearing, B', which is swiveled upon the supporting-frame and allows the rod A' to move laterally at its rear end with any swinging of those parts, and also to rise and sink in traveling over uneven ground. It reliably supports the forward end of the rocking rod or shaft A'. The forward end of A' carries a rigidly-attached arm, D', to which is pivoted the end of a transverse connecting-rod, E', which thereby, as the rod A' is rocked, communicates a transverse reciprocating motion to the said dropping-slide J, which is equipped in the ordinary manner in the seed-boxes I to effect the measuring off and dropping of the proper quantity of the seed.

On the frame C, a little in the rear of the axle B, is mounted in suitable bearings a crank-shaft, H'. The cranked part of H' stands under the lower side of the marker-frame T, in a position to lift it when required.

To the middle part of the crank-rod H' is pivoted the rear end of the connecting-rod I', the forward end of which is pivoted to the lever J' at a little distance from its lower end. The lower end of the lever J' is pivoted to the axle B or the frame C, and its upper end projects upward into such a position that it may be conveniently reached and operated by the driver from his seat E.

To the sides of the side bars of the frame T are attached plates K', the lower edges of which are inclined and project beneath the lower sides of the said side bars, to serve as shoulders or catches for the crank-rod H' to act against to support the marker. The part of the crank-rod H' that comes in contact with the bars of the frame T may have rollers placed upon it, to prevent friction as it moves along the said bars in raising the marker.

We have called the device V W a "marker," with reference to its function, to plainly indicate by the distinct cavities made in the ground points near where the corn is planted, to aid the operator in planting in corresponding positions in the subsequent traverses of the machine back and forward across the field—in other words, to aid in planting the seed in check-rows. It will be understood that it performs the function of marking by thus producing cavities by the pointed feet V', and that it also serves, in effect, as a pair of driving-wheels to operate the seed-slide through the connections described.

In order to control the position of the cavities before starting the machine, we set the points of the marker on the ground and let it run independent of the driver to the other end of the field. Arriving at the other end of the field, we raise our marker clear off the ground and turn around. After turning around, we lower the marker on the ground with the feet in line with the cavities previously made in coming across the field. We then let the marker run independent until the machine arrives at the other end of the field. The cavities thus made in going and coming across the field will be found to be in true check, and as the corn is planted exactly in the center of the cavities it will be in check too.

The feet V' of our marker are forward inclined, so as to enter the ground squarely. The front and rear edges of the bars V are made sharp, so as to pass through the ground freely whenever such shall become necessary by the sinking of the feet V'.

The bearing-pieces K', by means of which the marker-frame T rests on the crank-shaft H', extend down farther at their forward ends than at the rear. We can, by adjusting these pieces K' forward and backward, regulate the depth to which the marker-frame is allowed to descend before it rests on the crank-shaft. This adjustment is important in adapting the machine to work successfully on soil which varies in quality, hardness, &c. In some soils it is desirable to allow the marker to descend farther than in others.

The marker-frame will rise and sink with the action of each of the several feet. Our machine allows for this motion, as well as for all the others to which the parts are subjected. The elevation of the marker-frame by the action of the hand-lever J' is facilitated by this tendency of the frame to rise and sink continuously while the machine is in motion.

We claim as our invention—

1. The front runner-frame, the main frame hinged thereto, and the marker-frame connected by the universal joint to the front frame and carrying marker-wheels having actuating-rollers, in combination with the rock-shaft A', connecting directly with the front frame for operating the seeding devices, substantially as described.

2. In a seed-planter, the runners G and seeding devices, bearing wheels A, and frame C, in combination with each other and with an appended marker, U V W, U-shaped frame T, and universal joint in the front frame, consisting of the lateral moving part P and the vertical moving part R, pivoted thereto and surrounding the part P, arranged for joint operation as herein specified.

3. In a seed-planter, the cranked bearing H' and means, I' J', for forcibly raising it at will, in combination with the frame T, universal joint O P Q R S on front frame, shaft U, marking devices V W, and means X Y Z, and rocking shaft A', for communicating motion from the marking devices directly to the seeding devices on front frame, as herein specified.

In testimony whereof we have hereunto set our hands, at Niantic, Macon county, Illinois, this 19th day of October, 1880, in the presence of two subscribing witnesses.

JAMES P. HALL.
HENRY JACOBSEN.

Witnesses:
Z. SPIERS,
L. H. CHAMBERS.